United States Patent
Yao (10) Patent No.: US 8,692,485 B2
(45) Date of Patent: Apr. 8, 2014

(54) INTELLIGENT ELECTRICAL SYSTEMS FOR POWERING ELECTRICAL CIRCUITS

(76) Inventor: George Yao, Irving, TX (US)

( * ) Notice: Subject to any disclaimer, the term of this patent is extended or adjusted under 35 U.S.C. 154(b) by 195 days.

(21) Appl. No.: 13/426,406

(22) Filed: Mar. 21, 2012

(65) Prior Publication Data

US 2012/0249015 A1    Oct. 4, 2012

Related U.S. Application Data

(60) Provisional application No. 61/465,917, filed on Mar. 28, 2011.

(51) Int. Cl.
 *H05B 37/02* (2006.01)
(52) U.S. Cl.
 USPC .............................. 315/307; 315/86; 362/208
(58) Field of Classification Search
 USPC ......... 315/307, 86, 200 A; 323/304; 362/203, 362/208, 205
 See application file for complete search history.

(56) References Cited

U.S. PATENT DOCUMENTS

| | | | |
|---|---|---|---|
| 6,249,089 B1 | 6/2001 | Bruwer | |
| 6,621,225 B2 | 9/2003 | Bruwer | |
| 6,650,066 B2 | 11/2003 | Bruwer | |
| 6,841,941 B2 * | 1/2005 | Kim et al. | 315/86 |
| 7,116,061 B2 * | 10/2006 | Kim et al. | 315/200 A |
| 8,120,268 B2 * | 2/2012 | Spartano et al. | 315/246 |
| 2004/0140771 A1 * | 7/2004 | Kim et al. | 315/86 |
| 2005/0077837 A1 * | 4/2005 | Kim et al. | 315/200 A |
| 2006/0050504 A1 * | 3/2006 | Mah | 362/192 |
| 2007/0268689 A1 * | 11/2007 | Mah | 362/192 |
| 2009/0189547 A1 * | 7/2009 | Spartano et al. | 315/307 |
| 2009/0189548 A1 * | 7/2009 | Hoffman et al. | 315/307 |

* cited by examiner

*Primary Examiner* — Daniel D Chang (57) ABSTRACT

An electrical system for powering electrical circuits has a current varying device electrically coupled to a power consuming device and an exhaustible power source connector. A first microprocessor receives power through the exhaustible power source connector and communicates with a first signal modulator and demodulator. An inductor is responsive to the current varying device from which power is drawn. A second microprocessor receives power from the inductor and communicates with a second signal modulator and demodulator. The second signal modulator and demodulator receive power from the inductor.

20 Claims, 6 Drawing Sheets

INTELLIGENT ELECTRICAL SYSTEMS FOR POWERING ELECTRICAL CIRCUITS

CROSS REFERENCE TO RELATED APPLICATIONS

The present patent application is related to and claims the benefit of provisional patent application No. 61/465,917, filed on Mar. 28, 2011, entitled ELECTRICAL ENERGY HARVESTING METHOD FOR POWERING ELECTRICAL CIRCUITS, the entire contents of which is enclosed by reference herein.

BACKGROUND OF THE INVENTION

Field of the Invention

The method and system are generally related to powering secondary circuits using power derived from the voltage oscillations associated with direct current to direct current conversion and more specifically to an intelligent electrical system for powering electrical circuits.

Currently, light emitting devices have been continuously on a trend of reducing energy consumption per lumen of light. This reduction of energy has been assisted by the inclusion of intelligence in the form of processing to the light emitting device. This reduction in electrical expenditure has been primarily focused on the light generation portion of the device. This energy conservation intelligence has been primarily located at one location either in the head or the tail of the device. The powering of the secondary location has required separate wiring or battery dedicated to the tail portion to support the additional processor.

Therefore, what is needed is an intelligent electrical system for powering electrical circuits. More specifically, what is needed is a system that does not require direct wiring to implement, does not consume appreciable current when the light is not activated and uses the noise in the circuit from the DC to DC conversion to power the secondary processor.

It is envisioned that the system includes bi-directional communication between the first microprocessor and the second microprocessor and if sufficient voltage is not available to either use a voltage pump or pull current directly from the battery to accomplish the secondary processing.

SUMMARY

An example of the system would be a flashlight having a head and a tail. In the head portion there is a light emitter, a DC/DC converter, a first microprocessor and a first signal modulator and demodulator. The flashlight tail portion has an inductor having an induction coil, a second signal modulator and demodulator and a second microprocessor. The inductor and the flashlight conductive casing form electrical energy paths.

The DC current in the electrical loop is not affected by the inserted inductor. When the DC/DC converters are in operation, the current in the electrical loop will fluctuate. The fluctuation of the current in the electrical loop can also be induced by switching devices in the head portion of the flashlight.

As an electrical energy storage device, the inductor stores energy whenever the electrical current that flow through it fluctuates. A portion of that stored energy in the inductor can be extracted and used to power the second microprocessor and other electrical components in the tail portion of the flashlight.

The flashlight in the example could be exchanged for a lantern, a lamp, a flasher and the like. The DC to DC converter in the preceding example may also be exchanged for a linear regulator or a switching regulator or the like. The light emitter could be a light emitting diode (LED), a high intensity discharge lamp (HID) and an incandescent bulb or the like.

The first and second microprocessors in the example could be simple logic circuits. Additionally, first microprocessor may be communicably coupled to the second microprocessor. A bi-directional signaling path using carrier modulation may be established between the first microprocessor and the second microprocessor. Switch actions and other controlling signals could be transmitted via the modulated signal path to the microprocessor in the head portion and interpreted and executed according to the rules and states of the flashlight. Actions and signals sent to the tail are transmitted via the modulated signaling path to the second microprocessor to be interpreted and executed there.

The modulator/demodulator of the example could also be exchanged for a digital to analog converter (DAC), both a digital to analog converter and analog to digital converter (DAC/ADC).

If the voltage on the inductor is not high enough to power the circuit in the tail portion of the flashlight, a transformer can be used to step-up the voltage on the inductor to a higher level. A boost DC/DC converter can be implemented using the inductor in the tail portion as the sole energy storage device for voltage boosting. Additionally, a voltage pump could be employed.

The tail portion contains switches and possibly indicators. The batteries can be connected to the flashlight in the head portion or in the tail portion.

In a first example an electrical system for powering electrical circuits has a current varying device electrically coupled to a power consuming device and an exhaustible power source connector. A first microprocessor receives power through the exhaustible power source connector and communicates with a first signal modulator and demodulator. An inductor is responsive to the current varying device from which power is drawn. A second microprocessor receives power from the inductor and communicates with a second signal modulator and demodulator. The second signal modulator and demodulator receive power from the inductor.

The first microprocessor may communicate with the second microprocessor. The power consuming device may comprise a light emitter. The current varying device may comprise a direct current to direct current converter. The first and second microprocessors are logic circuits. The first and second signal modulator and demodulator may be digital to analog converters, digital to analog converter and analog to digital converter pair, or the like. A supplemental device may be capable of increasing a voltage to power the second microprocessor, where the supplemental device is a voltage pump, a transformer, a boost switching regulator or the like.

In another example a flashlight has a flashlight head portion and a tail portion, the head portion including a light emitter. A current varying device is electrically coupled to the light emitter and a battery connector. A first microprocessor receives power through the battery connector. A first signal modulator and demodulator communicate with the first microprocessor. A flashlight tail portion includes an inductor responsive to the current varying device. A second microprocessor receives power from the inductor and communicates with the second signal modulator and demodulator. The second signal modulator and demodulator receive power from the inductor.

The light emitter may be a light emitting diode. The current varying device comprises a direct current to direct current converter. A supplemental device capable of increasing a voltage to power the second microprocessor may be part of the system, where the supplemental device is either a transformer, a voltage pump, a boost switching regulator or the like.

In yet a further example, An electrical system for powering flashlight electrical circuits has a flashlight head portion including a light emitter. A switching regulator is electrically coupled to the light emitter and a battery connector. A first logic circuit receives power through the battery connector. A first modulator communicates with the first logic circuit. A flashlight tail portion includes a transformer that has an inductor responsive to the switching regulator. A flashlight tail portion includes a second modulator electrically connected to the transformer. The second modulator receives power from the transformer. A second logic circuit communicates with the second modulator and receives power from the transformer. A switch communicates with the second logic circuit. The light emitter may comprise a light emitting diode.

DETAILED DESCRIPTION

Figure 1:
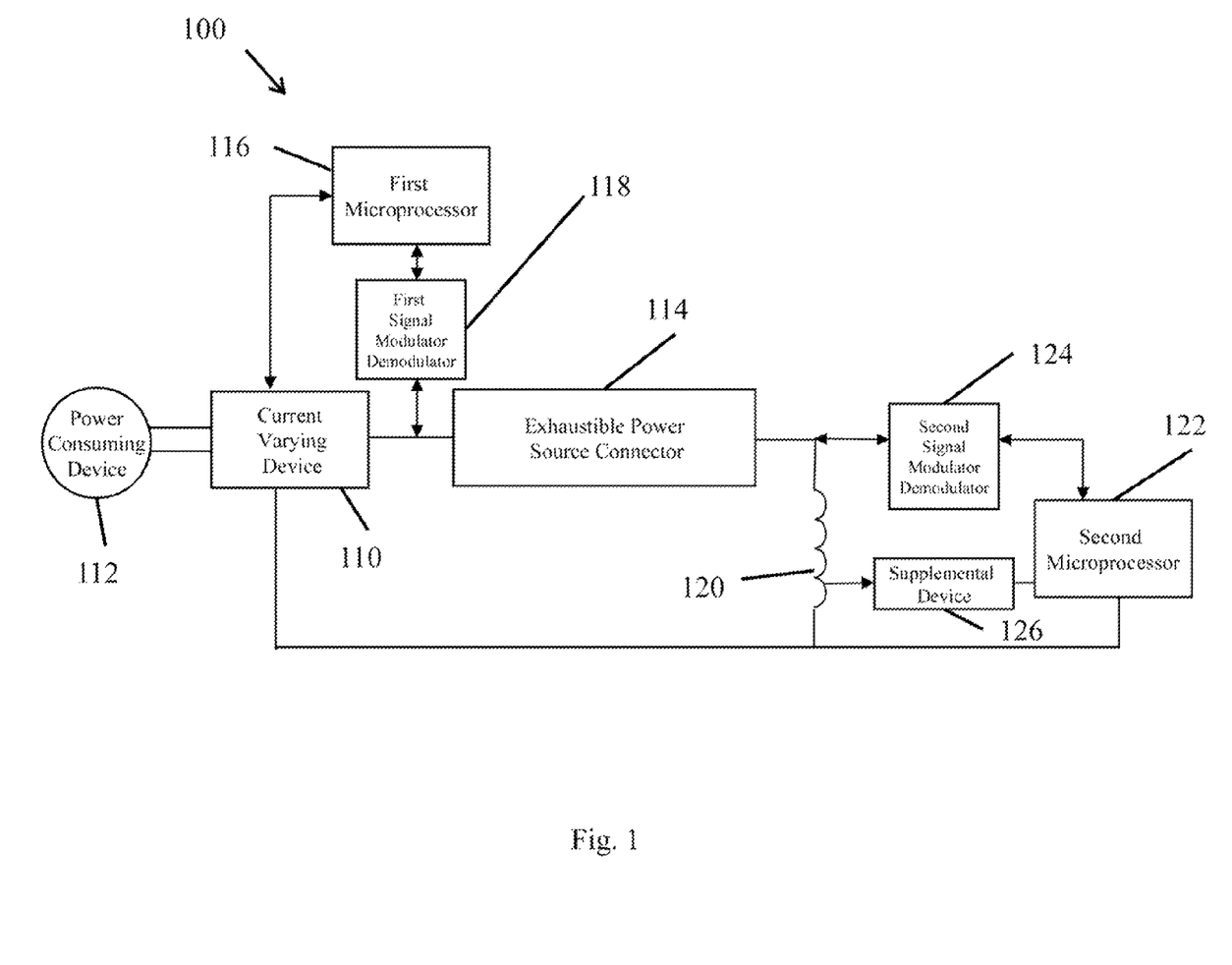
FIG. 1 depicts a first example of the intelligent electrical system for powering electrical circuits.

FIG. 1 shows a preferred example system diagram of an electrical system for powering electrical circuits 100 having a current varying device 110 electrically connected to a power consuming device 112. An exhaustible power source connector 114 is electrically connected to the current varying device. A first microprocessor 116 receives power through the exhaustible power source connector, and a first signal modulator, and demodulator 118 communicates with the first microprocessor. An inductor 120 is responsive to the current varying device. The parts so far named form a first loop. A second microprocessor 122 receives power from the inductor, and a second signal modulator and demodulator 124 communicates with the second microprocessor. The second signal modulator and demodulator receive power from the inductor. A supplemental device 126 capable of increasing a voltage to power the second loop may be coupled to the inductor. The supplemental device may be a voltage pump, a transformer, or a boost switching regulator, or the like. The system forms two loops, a loop with the first microprocessor controlling the power to the power consuming device and a loop with the second microprocessor being powered by the inductor supplied power. Parts within the two loops communicate with their corresponding counterparts to form a bigger loop. For example, the first and second modulators and demodulators work together to modulate electrical signals going through the big loop.

Figure 2:
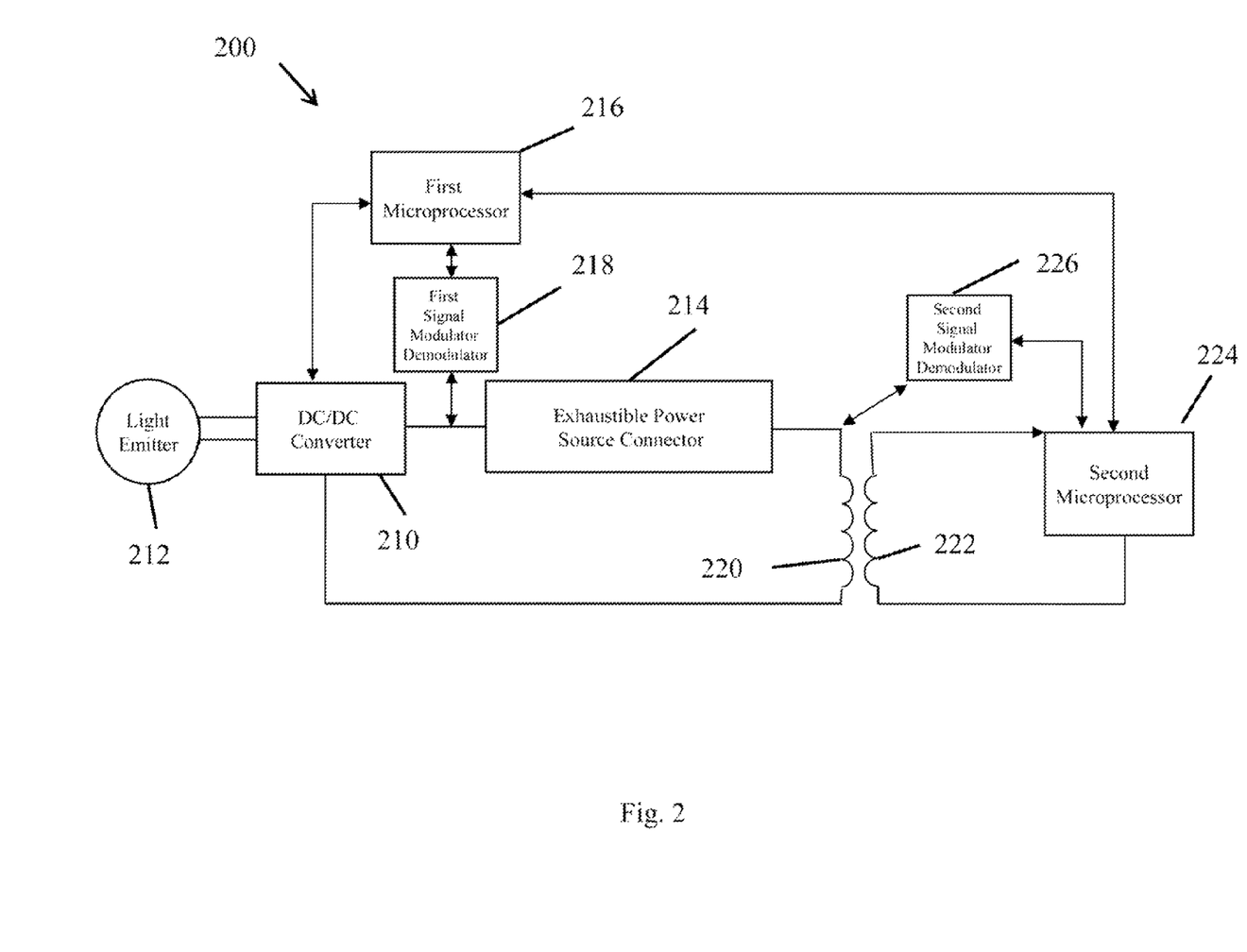
FIG. 2 depicts a second example of the intelligent electrical system for powering electrical circuits.

FIG. 2 shows another example system diagram of an electrical system for powering electrical circuits 200 has a direct current to direct current (DC/DC) converter 210 electrically connected to a light emitting device 212. An exhaustible power source connector 214 is electrically connected to the DC/DC converter. A first microprocessor 216 receives power through the exhaustible power source connector, and a first signal modulator and demodulator 218 communicates with the first microprocessor. The first microprocessor communicates with the DC/DC converter. An inductor 220 is responsive to the DC/DC converter. The inductor is paired with a second coil 222, and the inductor and second coil in tandem act as a transformer. The transformer, depending upon design can either be a step up transformer which increases the voltage, or a step down transformer which increases the current. A second microprocessor 224 receives power from the inductor via the second coil. A second signal modulator and demodulator 226 communicates with the second microprocessor. The second signal modulator and demodulator receive power from the inductor. The second microprocessor communicates with the first microprocessor. This system also has two loops with the inductor being part of the first loop and second coil being part of the second loop. Parts within the two loops communicate with their corresponding counterparts to form a bigger loop.

Figure 3:
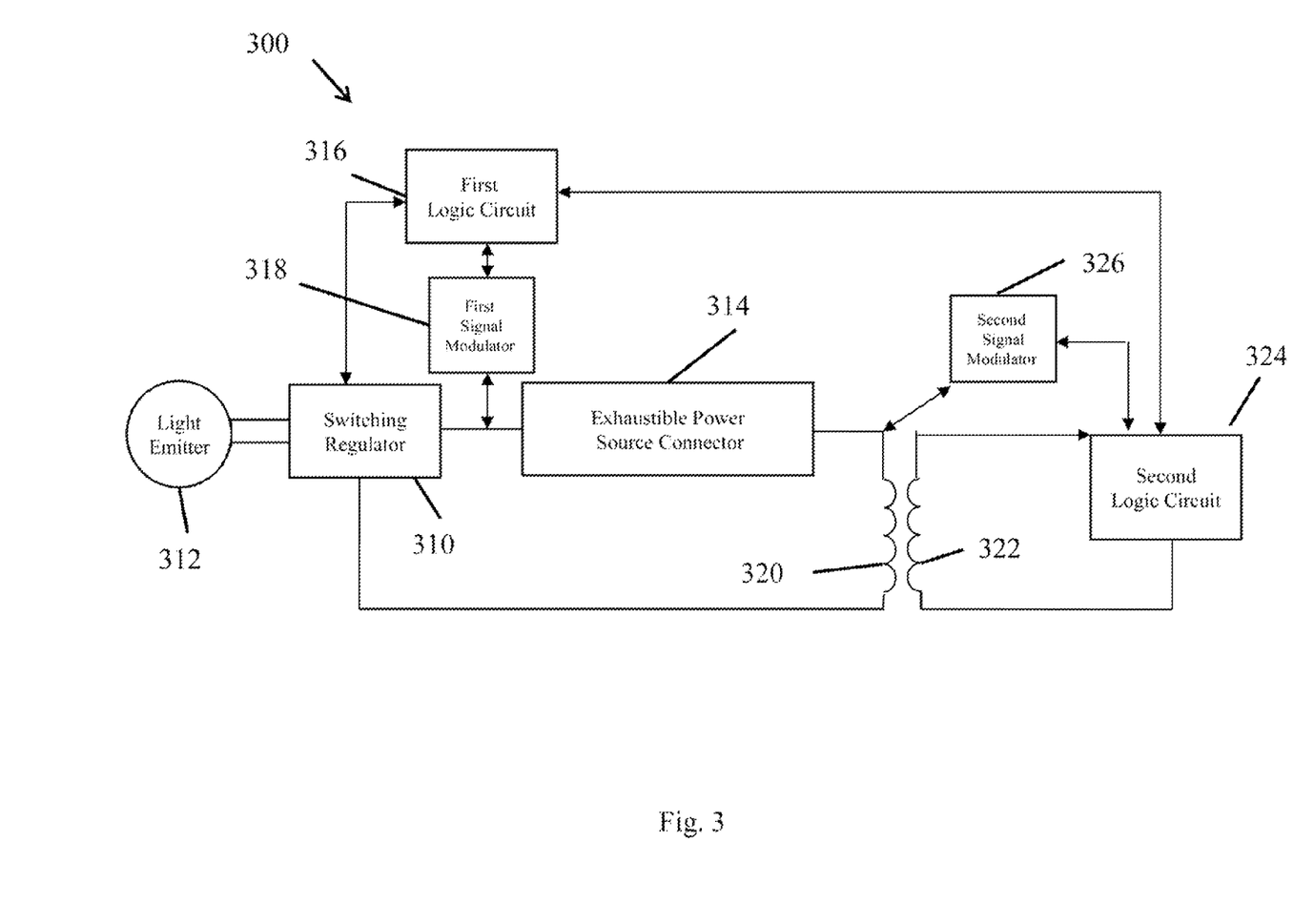
FIG. 3 depicts a third example of the intelligent electrical system for powering electrical circuits.

FIG. 3 shows yet another example system diagram of an electrical system for powering electrical circuits 300 has a switching regulator 310 electrically connected to a light emitting device 312. An exhaustible power source connector 314 is electrically connected to the switching regulator. A first logic circuit 316 receives power through the exhaustible power source connector, and a first signal modulator 318 communicates with the first logic circuit. The first logic circuit communicates with the switching regulator. An inductor 320 is responsive to the switching regulator. The inductor is paired with a second coil 322, and the inductor and second coil in tandem act as a transformer. A second logic circuit 324 receives power from the inductor via the second coil. A second signal modulator 326 communicates with the second logic circuit and receives power from the inductor. The second logic circuit communicates with the first logic circuit. This system also has two loops with the inductor being part of the first loop and second coil being part of the second loop. Parts within the two loops communicate with their corresponding counterparts to form a bigger loop.

Figure 4:
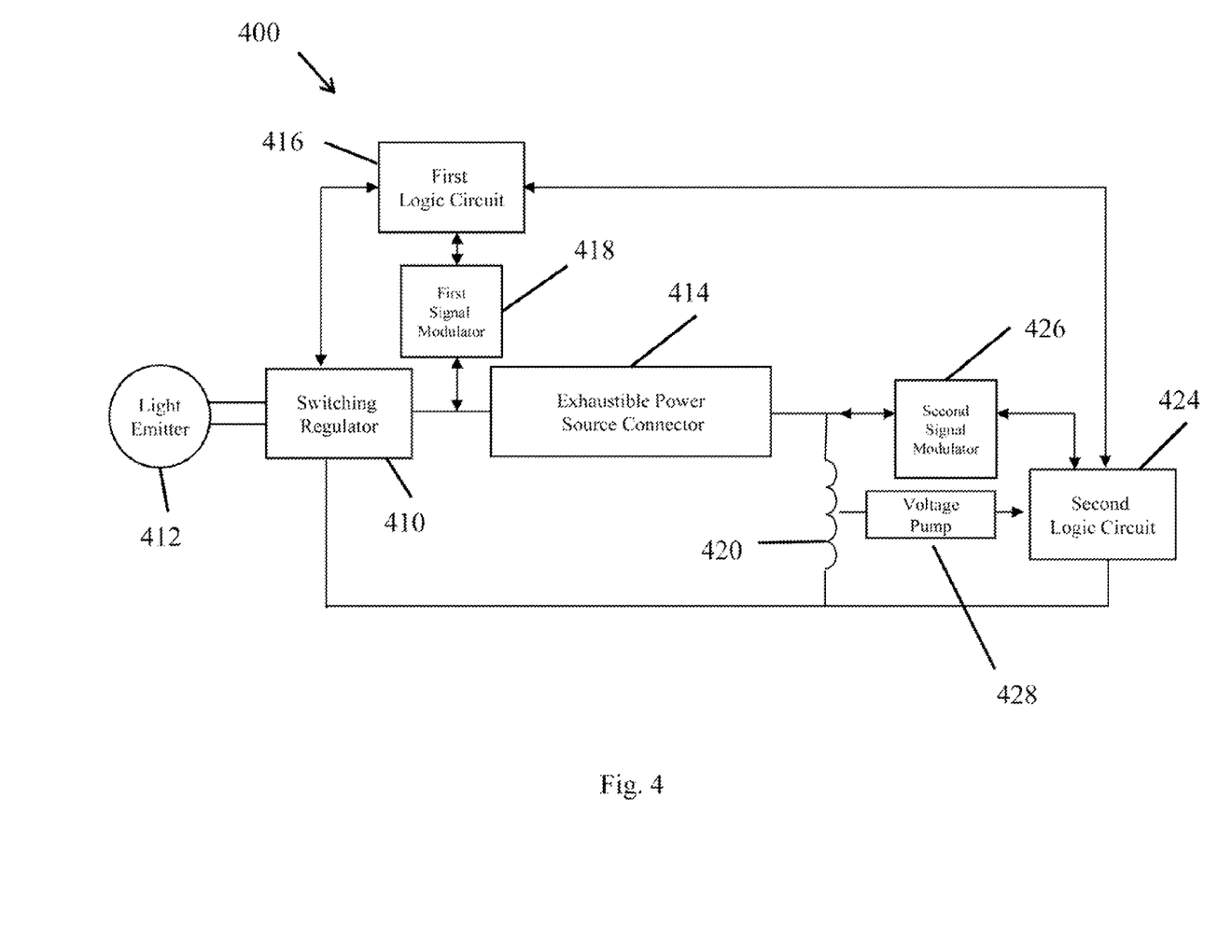
FIG. 4 depicts a fourth example of the intelligent electrical system for powering electrical circuits.

FIG. 4 shows yet another example system diagram 400. An electrical system for powering electrical circuits 400 has a switching regulator 410 electrically connected to a light emitting device 412. An exhaustible power source connector 414 is electrically connected to the switching regulator. A first logic circuit 416 receives power through the exhaustible power source connector, and a first signal modulator 418 communicates with the first logic circuit. The first logic circuit communicates with the switching regulator. An inductor 420 is responsive to the switching regulator. A second logic circuit 424 receives power from the inductor. A second signal modulator 426 communicates with the second logic circuit. The second signal modulator receives power from the inductor. The second logic circuit communicates with the first logic circuit. This system has a voltage pump 428 which supplies additional voltage to the second logic circuit in the event that the inductor does not supply sufficient voltage. The first loop in this system is comprised of the switching regulator connected to both the light emitter and the exhaustible power source connector controlled by the first logic circuit and the first signal modulator, and the inductor. The second loop comprises the inductor, the voltage pump, the second signal modulator and the second logic circuit. Parts within the two loops communicate with their corresponding counterparts to form a bigger loop.

Figure 5:
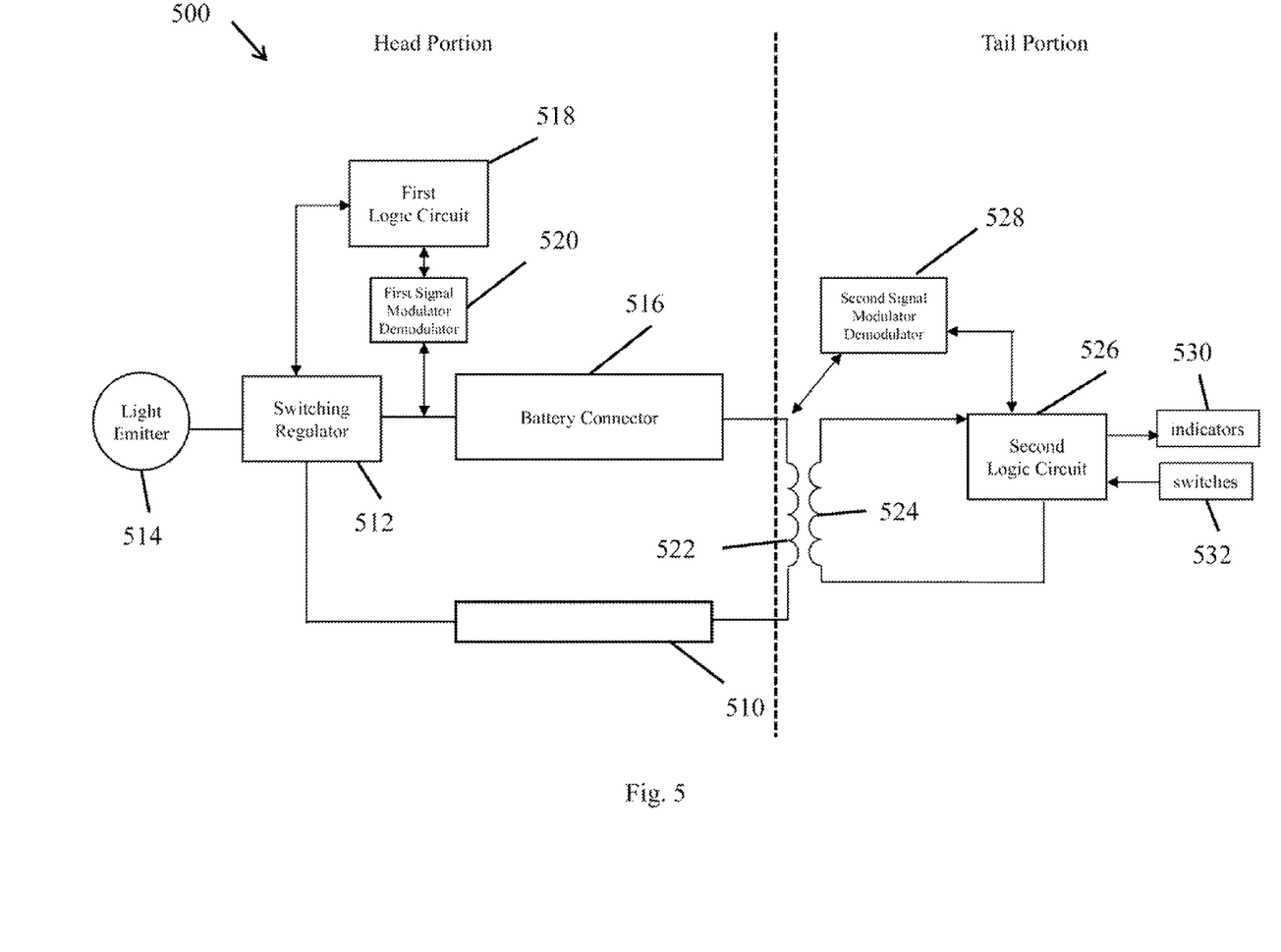
FIG. 5 depicts a fifth example of the intelligent electrical system for powering electrical circuits for a flashlight.

FIG. 5 shows a further exemplary system diagram 500 having a head portion and a tail portion. A switching regulator 512 is electrically connected to a light emitting device 514. An exhaustible power source connector 516 is electrically connected to the switching regulator. A first logic circuit 518 receives power through the exhaustible power source connector and a first signal modulator and demodulator 520 communicates with the first logic circuit. The first logic circuit communicates with the switching regulator. The flashlight body forms a portion of the electrical circuit loop of the device. An inductor 522 is responsive to the switching regulator. The inductor is paired with a second coil 524 and the inductor and second coil in tandem act as a transformer. A second logic circuit 526 receives power from the inductor via the second coil. A second signal modulator and demodulator 528 communicate with the second logic circuit. The second signal modulator receives power from the inductor. This system has two loops with the inductor being part of the first loop and second coil being part of the second loop. Parts within the two loops communicate with their corresponding counterparts to form a bigger loop. The system additionally comprises an indicator 530 and a switch 532.

Figure 6:
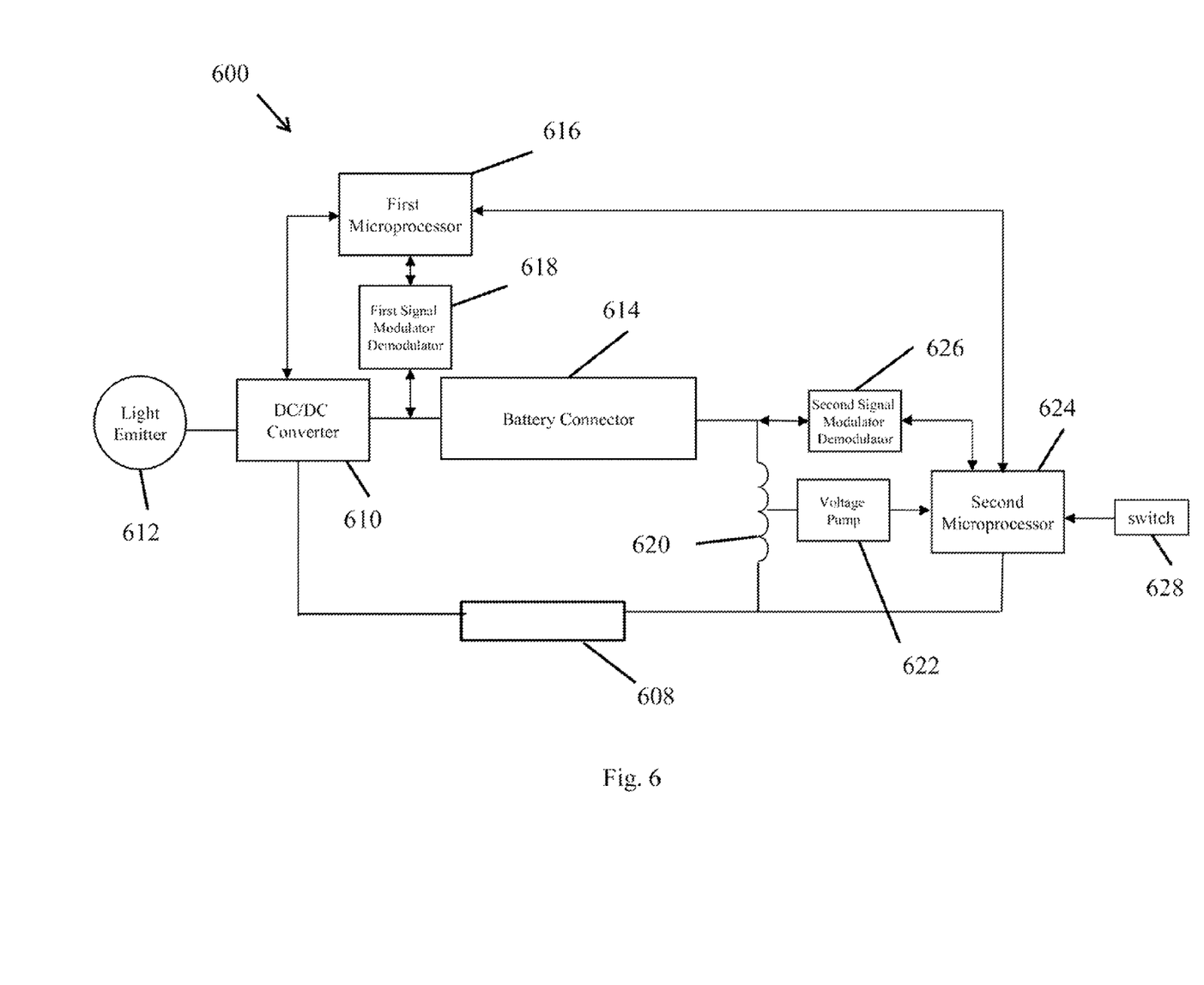
FIG. 6 depicts a sixth example of the intelligent electrical system for powering electrical flashlight circuits for a flashlight.

FIG. 6 shows yet a further example system diagram 600 having a flashlight tail portion 608 that forms a portion of the electrical circuit loop of the device. The system has a direct current to direct current (DC/DC) converter 610 electrically connected to a light emitting device 612. An exhaustible power source connector 614 is electrically connected to the DC/DC converter. A first microprocessor 616 receives power through the exhaustible power source connector and a first signal modulator and demodulator 618 communicates with the first microprocessor. The first microprocessor communicates with the DC/DC converter. An inductor 620 is responsive to the DC/DC converter. This system has a voltage pump 622 which supplies additional voltage to the circuit in the event that the inductor does not supply sufficient voltage. A second microprocessor 624 receives power from the inductor via the second coil. A second signal modulator and demodulator 626 communicate with the second microprocessor. The second signal modulator and demodulator receive power from the voltage pump. The second microprocessor communicates with the first microprocessor. This system also has two loops with the inductor being part of the first loop. The first loop in this system is comprised of the DC/DC converter connected to both the light emitter and the exhaustible power source connector controlled by the first microprocessor and the first signal modulator and demodulator with the inductor in the flashlight tail portion forming a complete electrical connectivity for the circuit. The second loop comprises the inductor, the voltage pump the second signal modulator and demodulator and the second microprocessor. Parts within the two loops communicate with their corresponding counterparts to form a bigger loop. A switch 628 is connected to the second microprocessor.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by integration of various discrete components such as micro-processing and signal modulation and demodulation. Further, although depicted in a particular manner, various modules or blocks may be repositioned without departing from the scope of the current invention. Further, a lesser or greater number of microprocessors may be utilized with the present invention, to provide additional known features to the present invention, and/or to make the present invention more efficient.

What is claimed is:

1. An electrical system for powering electrical circuits comprising:
    a power consuming device;
    a current varying device electrically coupled to said power consuming device;
    an exhaustible power source connector electrically coupled to said current varying device;
    a first microprocessor receiving power through said exhaustible power source connector;
    a first signal modulator and demodulator communicably coupled to said first microprocessor;
    an inductor responsive to said current varying device;
    a second microprocessor receiving power at least in part from said inductor; and
    a second signal modulator and demodulator communicably coupled to said second microprocessor, said second signal modulator and demodulator receiving power at least in part from said inductor.

2. The system of claim 1 wherein said first microprocessor and said second microprocessor are communicably coupled.

3. The system of claim 1 wherein said power consuming device comprises a light emitter.

4. The system of claim 1 wherein said current varying device comprises a direct current to direct current converter.

5. The system of claim 1 wherein said first microprocessor comprises a logic circuit and wherein said second microprocessor comprises a logic circuit.

6. The system of claim 1 wherein said first signal modulator and demodulator comprises a digital to analog converter and wherein said second signal modulator and demodulator comprises a digital to analog converter.

7. The system of claim 1 wherein said first signal modulator and demodulator comprises a digital to analog converter and analog to digital converter pair and wherein said second signal modulator and demodulator comprises a digital to analog converter and analog to digital converter pair.

8. The system of claim 1 further comprising a supplemental device capable of increasing a voltage to power said second microprocessor.

9. The system of claim 8 wherein said supplemental device comprises a voltage pump.

10. The system of claim 8 wherein said supplemental device comprises a transformer.

11. The system of claim 8 wherein said supplemental device comprises a boost switching regulator.

12. A flashlight comprising:
    a flashlight head portion including a light emitter;
    a current varying device electrically coupled to said light emitter;
    a battery connector electrically coupled to said current varying device;
    a first microprocessor receiving power through said battery connector;
    a first signal modulator and demodulator communicably coupled to said first microprocessor;
    a flashlight tail portion including an inductor responsive to said current varying device;
    a second microprocessor receiving power at least in part from said inductor; and a second signal modulator and demodulator communicably coupled to said second microprocessor, said second signal modulator and demodulator receiving power at least in part from said inductor.

13. The flashlight of claim 12 wherein said light emitter comprises a light emitting diode.

14. The flashlight of claim 12 wherein said current varying device comprises a direct current to direct current converter.

15. The flashlight of claim 12 further comprising a supplemental device capable of increasing a voltage to power said second microprocessor.

16. The flashlight of claim 15 wherein said supplemental device comprises a transformer.

17. The flashlight of claim 15 wherein said supplemental device comprises a voltage pump.

18. The flashlight of claim 15 wherein said supplemental device comprises a boost switching regulator.

19. An electrical system for powering flashlight electrical circuits comprising:
   a flashlight head portion including a light emitter;
   a switching regulator electrically coupled to said light emitter;
   a battery connector electrically coupled to said switching regulator;
   a first logic circuit receiving power through said battery connector;
   a first modulator communicably coupled to said first logic circuit;
   a flashlight tail portion including a transformer, said transformer comprising an inductor responsive to said switching regulator;
   a flashlight tail portion including a second modulator electrically coupled to said transformer, said second modulator receiving power at least in part in part from said transformer;
   a second logic circuit communicably coupled to said second modulator, said second logic circuit receiving power at least in part from said transformer; and
   at least one switch communicably coupled to said second logic circuit.

20. The flashlight of claim 19 wherein said light emitter comprises a light emitting diode.

* * * * *